(12) United States Patent
Wang et al.

(10) Patent No.: US 11,935,664 B2
(45) Date of Patent: Mar. 19, 2024

(54) DYNAMIC CHARACTERISTIC ANALYSIS METHOD OF DET AND RELAP5 COUPLING BASED ON UNIVERSAL INSTRUMENTAL VARIABLE METHOD

(71) Applicant: Harbin Engineering University, Harbin (CN)

(72) Inventors: He Wang, Harbin (CN); Liangjun Wang, Harbin (CN); Dabin Sun, Harbin (CN); Haoyin Chen, Harbin (CN); Genglei Xia, Harbin (CN); Lei Li, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 98 days.

(21) Appl. No.: 17/861,465

(22) Filed: Jul. 11, 2022

(65) Prior Publication Data

US 2022/0375640 A1 Nov. 24, 2022

Related U.S. Application Data

(63) Continuation of application No. PCT/CN2022/088183, filed on Apr. 21, 2022.

(30) Foreign Application Priority Data

Mar. 12, 2021 (CN) .......................... 202110270621.1

(51) Int. Cl.
*G05B 23/00* (2006.01)
*G06F 30/20* (2020.01)
(Continued)

(52) U.S. Cl.
CPC ............. *G21D 3/007* (2019.01); *G06F 30/20* (2020.01); *G21D 3/002* (2019.01); *G21D 3/04* (2013.01); *G06F 2119/02* (2020.01)

(58) Field of Classification Search
USPC .... 340/679, 680, 681, 682, 683, 686.1, 687, 340/691.2, 693.1, 693.8, 3.43, 825.23,
(Continued)

(56) References Cited

U.S. PATENT DOCUMENTS

2010/0089586 A1* 4/2010 Stanecki ............. E21B 43/2401
166/302
2010/0114633 A1* 5/2010 Sislak .................... G08G 5/045
701/120

(Continued)

*Primary Examiner* — Daniel Previl
(74) *Attorney, Agent, or Firm* — Piloff Passino & Cosenza LLP; Rachel K. Piloff; Sean A. Passino (57) ABSTRACT

A dynamic characteristic analysis method of DET and RELAP5 coupling based on a universal instrumental variable method includes steps of: constructing a DET simulation model of a discrete dynamic event tree and modifying TRIP cards of an input file by adding universal instrumental TRIP variables according to state transition types of DET simulation objects, the universal instrumental TRIP variable being variable type or logical type; setting a simulation time of the RELAP5, controlling a simulation step, and analyzing an output result file of each simulation step of the RELAP5; backtracking the RELAP5 according to state transition types of DET simulation objects. The dynamic characteristic analysis method has advantages of simplifying TRIP setting process and method of DET state transition objects in an input file of the RELAP5 required for the coupling of DET and RELAP5, reducing a modeling complexity and improving a modeling efficiency.

10 Claims, 5 Drawing Sheets

(51) Int. Cl.
*G21D 3/00* (2006.01)
*G21D 3/04* (2006.01)
*G06F 119/02* (2020.01)

(58) Field of Classification Search
USPC .............................. 340/5.32, 825.68, 815.45
See application file for complete search history.

(56) References Cited

U.S. PATENT DOCUMENTS

| | | | | |
|---|---|---|---|---|
| 2010/0258309 | A1* | 10/2010 | Ayodele | E21B 43/243 |
| | | | | 166/272.3 |
| 2010/0282460 | A1* | 11/2010 | Stone | E21B 43/2401 |
| | | | | 700/29 |
| 2012/0029897 | A1* | 2/2012 | Cherian | H02J 13/00028 |
| | | | | 703/18 |
| 2012/0191439 | A1* | 7/2012 | Meagher | G06Q 50/00 |
| | | | | 703/18 |
| 2012/0191440 | A1* | 7/2012 | Meagher | G06F 30/00 |
| | | | | 703/18 |

* cited by examiner

DYNAMIC CHARACTERISTIC ANALYSIS METHOD OF DET AND RELAP5 COUPLING BASED ON UNIVERSAL INSTRUMENTAL VARIABLE METHOD

CROSS-REFERENCE TO RELATED APPLICATIONS

This application is a continuation of an international Patent Application No. PCT/CN2022/088183, filed on Apr. 21, 2022. The International patent application claims priority to Chinese Patent Application No. 202110270621.1, filed on Mar. 12, 2021. The contents of the above-mentioned patent applications are hereby incorporated by reference.

TECHNICAL FIELD

The application relates to the field of safety analysis of nuclear power plants, and in particular to a dynamic characteristic analysis method of DET (dynamic event tree) and RELAP5 coupling based on a universal instrumental variable method.

BACKGROUND

Traditional nuclear power plant safety analysis methods include deterministic safety analysis method and probabilistic safety analysis method. Among the two methods, deterministic safety analysis widely adopts RELAP5 (i.e., reactor excursion and leak analysis program) software, while probabilistic safety analysis method is based on traditional event tree/fault tree method. Single determinism or probability theory method has limitations in analyzing the dynamic characteristics of nuclear power plant accidents. For example, the results of nuclear power plant case analysis disclosed by Electricite De France show that the traditional analysis method is quite conservative in estimating the radioactive release frequency caused by severe accidents in nuclear power plants. Therefore, in order to explicitly model the possible complex interaction model between hardware/software/process/human behavior in the process of complex system evolution, a dynamic event tree method is developed. Moreover, the main difference between the dynamic event tree method and the traditional analysis method lies in that the physical process of nuclear power plant accident is driven by the dynamic simulation evolution results of nuclear power plant system, which reduces the dependence on the experience of analysts and unnecessary conservative engineering judgments.

At present, discrete dynamic event tree (DDET) is a widely used method of dynamic event tree in practical engineering applications (hereinafter, unless otherwise specified, DDET is abbreviated as DET). DET method generates a series of event sequences with dynamic changes in time according to its effective branching rules, and specifically determines the evolution path of the system by determining the branching conditions. When the conditions are met, the complex system evolves on different branching paths, and then a series of event sequence sets are obtained to generate DET models. After the DET model is generated, all the event sequences represented by branches can be simulated by deterministic safety analysis method, and deterministic analysis can be carried out. Through the dynamic coupling between DET and deterministic analysis software, not only the traditional deterministic analysis results is obtained, but also the possibility (occurrence probability) of the calculation results, which can provide risk-informed decision support information for the design, operation and management of nuclear power plants.

Traditionally, based on the deterministic safety analysis of nuclear power plants, the discrete dynamic event tree method requires a lot of computing resources and generates a lot of data. However, the traditional method based on the analysis boundary conditions manually set by analysts can't meet the above requirements. Therefore, it is urgent to develop a nuclear power plant safety analysis method, technical scheme and analysis tool that can automatically realize the coupling of DET method and deterministic analysis software, and then dynamically simulate the accident evolution process of nuclear power plants in a probabilistic environment, so as to obtain the safety margin characteristics and safety performance of nuclear power plants.

SUMMARY

In order to solve the above problems and overcome the shortcomings of traditional deterministic safety analysis and probabilistic safety analysis of nuclear power plants, this application provides a dynamic characteristic analysis method of discrete dynamic event tree (DET) and RELAP5 coupling based on a universal instrumental variable method. This method has strong universality and wide application range, which only needs to distinguish whether the state transition of DET simulation object belongs to parametric state transition or logical state transition. There is no need to distinguish between operation type and demand type, one transfer or multiple transfers, and the logical judgment relationship of transfer conditions for simulation objects.

The application is realized by the following technical scheme: a dynamic characteristic analysis method of DET and RELAP5 coupling based on universal instrumental variable method includes the following steps:

S1, constructing a DET simulation model of a discrete dynamic event tree, and modifying a TRIP card of an input file of the RELAP5 software by adding a universal instrumental TRIP variable according to a state transition type of a DET simulation object; the universal instrumental TRIP variable is variable type or logical type;

S2, determining a simulation time and a simulation step of the DET simulation object applied to the RELAP5 software, and running the RELAP5 software;

S3, analyzing a result file to obtain time information of state transition control TRIP variable change of the DET simulation object according to the result file of the simulation step output by the RELAP5 software;

S4, identifying a DET branch time of state transition occurrence of the DET simulation object occurs, and obtaining a RELAP5 restart number for the RELAP5 software backtracking restart according to a branch rule of the DET simulation model;

S5, determining a state transition type of the DET simulation object, updating a restart file for the RELAP5 software, and generating restart input files of a DET successful branch and a DET failed branch for RELAP5 software;

S6, determining a backtracking restart time of the RELAP5 software according to the DET branch time; taking the restart input files of the DET successful branch and the DET failed branch as inputs and combining with another result file of current simulation step calculated by the RELAP5, backtracking the RELAP5 software to complete simulation of next simulation steps of the DET successful branch and the DET failed branch; and S7, repeating the process from the step S2 to the step S6 until the simulation time reaches a simulation task time specified by a user, and then finishing the dynamic coupling between DET and RELAP5 software.

According to the technical scheme, the setting process and method of state transition TRIP of DET simulation objects in the input file of RELAP5 software are simplified by adding instrumental TRIP variables, the complexity is reduced, and the efficiency is improved.

In an embodiment, in the step S1, a system, equipment or personnel operation of an nuclear power plant is taken as the DET simulation object, and a state transition of the DET simulation object is controlled by the TRIP variable in the RELAP5; logic values of TRIP variable are divided into True and False; a TRIP variable space vector of DET simulation objects is $\vec{S} = \{s1, s2, \ldots, sn\}$, where n is the number of DET simulation objects, $S_i$ represents the logical value of TRIP corresponding to the $i^{th}$ DET simulation object, and $$S_i = \begin{cases} 0 \\ 1 \end{cases} 1 \leq i \leq n.$$

In an embodiment, in the step S2, determining an analysis object of initial accident of the nuclear power plant, and programming initial input card files for the RELAP5 software of simulating the accident of the nuclear power plant according to a deterministic analysis method; the input card files include an initial RELAP5 input file Root.i and an initial restart file $R_0$.i, where "Root" represents any file name that meets the requirements of the RELAP5 software, "$R_0$" represents a file name, and ".i" represents a file type.

According to the above technical scheme, this part is necessary for the coupling between RELAP5 and DET. The TRIP card of DET simulation object in the Root.i file needs to be modeled in the way of universal instrumental variables, so as to simplify content of the file.

In an embodiment, in the step S2, the initial restart file $R_0$.i for RELAP5 includes: a 103 card (i.e., restart input file control card) of the RELAP5 software, a time step control card (e.g., 201 card) of the RELAP5 software, and a 100 card (i.e., problem type and option card) of the RELAP5 software.

Through the above technical scheme, this step is necessary to restart and call the RELAP5 software, and this technical scheme is a part of the whole.

In an embodiment, in the step S3 and the step S4, a specific method of identifying the DET branch time/moment of state transition occurrence of the DET simulation object is as follows:

S31, obtaining the time information of state transition control TRIP variable change of the DET simulation object according to the step S3;

S32, judging whether there is a branch in the current simulation step; if there is no branch, updating the simulation time in the initial restart file $R_0$.i of RELAP5; the simulation time of the time control card in the input cards of the RELAP5 software is the sum of the simulation time at an end and a simulation step of the RELAP5 software; then taking the initial restart file $R_0$.i and the another result file Root.r as input, and running the RELAP5 software again; and S33, if there is a branch, obtaining the minimum TRIP trigger time of state transition of the DET simulation object by analyzing the result file, and then obtaining the RELAP5 restart number corresponding to a RELAP5 backtracking restart information block number according to the branch rule of the DET simulation model.

In accordance with the technical scheme, the traditional analysis method does not need to automatically backtrack to determine the RELAP5 restart number; the RELAP5 software, as packaged tool software, does not interact with the outside world within a simulation step, so the DET branch nodes can only be determined by analyzing the simulation output results of each step. This method can automatically and accurately identify the DET branch points that need to be modified.

In an embodiment, in the step S4, a DET backtracking restart number identification method is as follows:

S41, identifying a minimum TRIP trigger time TRIPTimemin and TRIP numbers corresponding to TRIPTimemin according to a TRIP trigger time set acquired at the DET branch time, comparing to select a state transition of the DET simulation object with the minimum TRIP number TRIPnummin in the TRIP numbers corresponding to TRIPTimemin to branch;

S42, judging whether the DET simulation object corresponding to TRIPTimemin is of single state transition type, if so, executing S44; otherwise, executing S43;

S43, in current simulation step, the DET simulation object possibly have multiple state transitions, so analyzing all Restart information blocks in the result file Root.o, comparing to obtain the smallest state transition moment of a DET branch simulation object in current simulation step, and assigning it to TRIPTimemin, then executing S44;

S44, replacing a corresponding element in {TRIPT1, TRIPT 2, . . . , TRIPT N} with TRIPTimemin, and then going to S45; and S45: calculating a DET backtracking restart information block number BloNum.

Through the technical scheme, the moment of state transition of DET simulation object can be automatically and accurately identified.

In an embodiment, the BloNum is calculated by the following formula:

$$\Delta t = \text{CpuTimemax} \times \text{ResFre}$$

$$BloNum = \text{INT}\left[\frac{TRIPTimemin}{\Delta t} - \frac{1}{2}\right]$$

where BloNum: the backtracking restart information block number calculated according to the minimum TRIP trigger time TRIPTimemin of state transition of DET simulation object;

CpuTimemax: a maximum simulation step time of CPU in a time control card of input cards of the RELAP5 software;

INT[ ]: a rounding function;

ResFre: a restart frequency of the time control card of the input cards of the RELAP5 software;

TRIPTimemin: the minimum TRIP trigger time of state transition of DET simulation object of calculation result in the current simulation step of the RELAP5 software; and $\Delta t$: a time interval between two restart information blocks in the time control card of the input cards of the RELAP5 software.

With the technical scheme, the RELAP5 restart time can be automatically and accurately determined according to the time when the state transition of the DET simulation object occurs.

In an embodiment, in the step S5, the update method of the restart file for RELAP5 is that at the end of each RELAP5 simulation step, the restart file needs to be updated according to the following two situations: ①, there is no state transition of DET simulation object in a DET branch; and ② there is state transition of DET simulation object in the DET branch.

The above technical scheme belongs to the actual physical process, which is divided according to whether the DET state is transitioned or not. As a result, there are two possibilities: success and failure, and an intermediate state of partial success is not considered.

In an embodiment, as there is no state transition of DET simulation object in the DET branch, RELAP5 restart file update method is as follows:

S511: updating a restart number at a first bit of a 103 card in the RELAP5 restart file of current node to be last restart number ResNumLast in a simulation result file *.o of current simulation step; and S512: updating a simulation end time SimTime at a first bit of a 201 time control card in the RELAP5 restart file of the current node according to the following formula:

SimTime=SimTime+ΔT

SimTime: a simulation time of the time control card in input cards of the RELAP5 software, that is, the simulation time at the end of the current node; ΔT: each the simulation step of the RELAP5 software.

With the above technical scheme, the simulation step of RELAP5 is conveniently controlled by setting ΔT by the user, and it is possible to dynamically adjust the step size and further improve the calculation efficiency. In the method, the transition of DET state object is identified in every ΔT step. If the system runs smoothly objectively and no state transition is expected, ΔT is dynamically set longer, which reduces the time for RELAP5 to stop, call and parse the output file, and improves the running efficiency as a whole.

In an embodiment, as there is a state transition of DET simulation object in the DET branch, RELAP5 restart file update method is as follows:

S521: updating a restart number of a first bit of a 103 card in the RELAP5 restart file *.i of the current node to be ResNum;

S522: updating a simulation end time SimTime of a first bit of a 201 time control card in the RELAP5 restart file *.i of the current node according to the following formula:

$$SimTime = INT\left[\frac{TRIPTimemin}{\Delta t} - \frac{1}{2}\right] \times \Delta t + \Delta T$$

INT[ ]: a rounding function; TRIPTimemin: a minimum TRIP trigger time of state transition of DET simulation object of calculation result in the current simulation step of the RELAP5 software; Δt: a time interval between two restart information blocks in the time control card in the input cards of the RELAP5 software; ΔT: each the simulation step of the RELAP5 software; and S523: updating the state transition control TRIP information of the DET simulation object by category.

With the technical scheme, the next simulation step of RELAP5 is automatically and dynamically determined according to the restart time.

Compared with the prior art, the application may have the following advantages.

(1) Based on the discrete dynamic event tree method and RELAP5 software, this application provides a nuclear power plant accident realization analysis method with dynamic coupling of deterministic theory and probability theory, which makes up for the deficiency of the traditional safety analysis method that the random failure of system, equipment and operators and the coupling influence of nuclear power plant dynamic process in the process of dealing with nuclear power plant accidents, improves the coupling analysis efficiency, reduces the dependence on the experience and judgment of analysts, and makes the analysis results more realistic.

(2) The application automatically obtains a large number of nuclear power plant accident simulation results, thus obtaining the safety characteristics of nuclear power plants under accident conditions, providing support for decision support of nuclear power plant design, operation and management based on risk guidance, optimizing nuclear power plant design, operation and management, and finally improving the safety and economy of nuclear power plants.

(3) The discrete dynamic event tree method in this application is widely used in dynamic probabilistic safety analysis, and the commercial software widely used in the field of nuclear safety analysis of nuclear power plants with RELAP5 software is convenient to be accepted by nuclear power engineers and application personnel, which is conducive to practical popularization and application.

(4) This method has wide applicability, and simulates the process of most nuclear power plant systems, equipment, operator operating state transition and system process parameter change in the process of accident analysis. And (5) This method is universal for dynamic performance analysis of accidents and transients in nuclear power plants, as well as performance analysis of other complex systems that can be simulated by RELAP5.

DETAILED DESCRIPTION OF THE EMBODIMENTS

Figure 1:
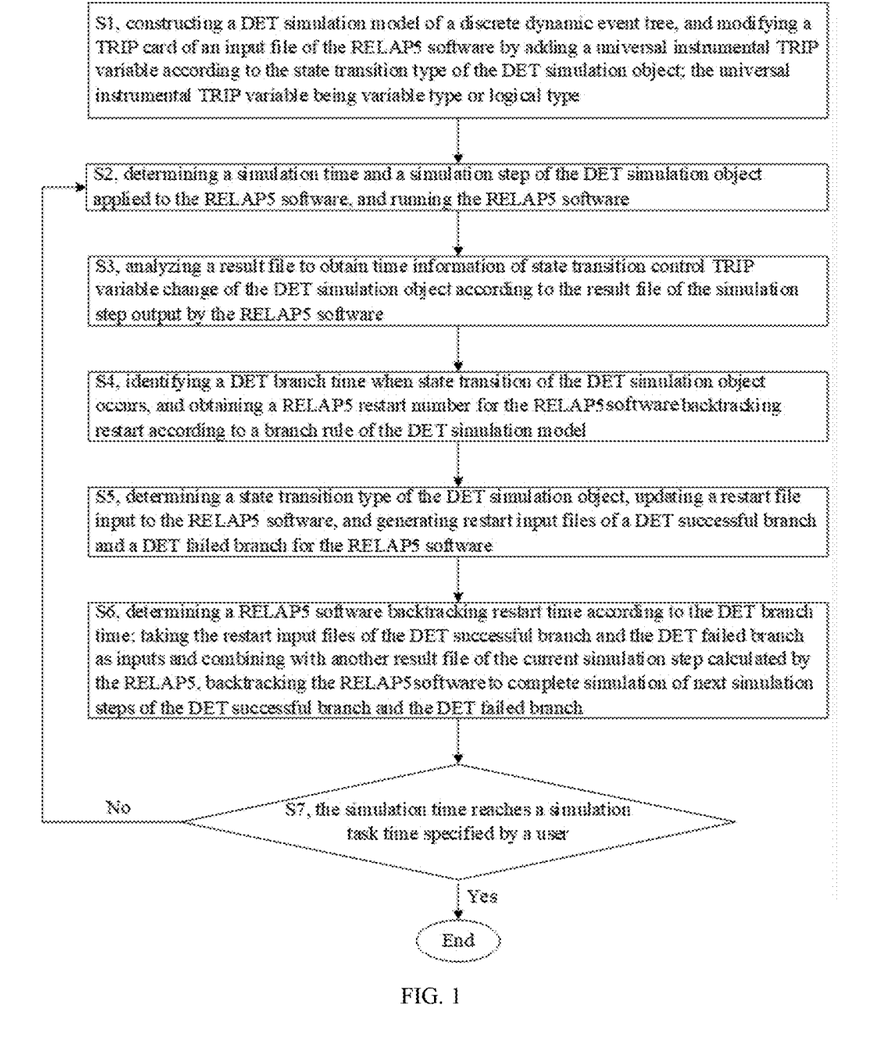
FIG. 1 is a schematic structural diagram of the present application.

A dynamic characteristic analysis method of DET and RELAP5 coupling based on universal instrumental variable method as shown in FIG. 1, including the following steps:

S1, constructing a DET simulation model of a discrete dynamic event tree, and modifying a TRIP card of an input file of the RELAP5 software by adding a universal instrumental TRIP variable according to the state transition type of the DET simulation object; the universal instrumental TRIP variable being variable type or logical type;

S2, determining a simulation time and a simulation step of the DET simulation object applied to the RELAP5 software, and running the RELAP5 software;

S3, analyzing a result file to obtain time information of state transition control TRIP variable change of the DET simulation object according to the result file of the simulation step output by the RELAP5 software;

S4, identifying a DET branch time when state transition of the DET simulation object occurs, and obtaining a RELAP5 restart number for the RELAP5 software backtracking restart according to a branch rule of the DET simulation model;

S5, determining a state transition type of the DET simulation object, updating a restart file input to the RELAP5 software, and generating restart input files of a DET successful branch and a DET failed branch for the RELAP5 software;

S6, determining a RELAP5 software backtracking restart time according to the DET branch time; taking the restart input files of the DET successful branch and the DET failed branch as inputs and combining with another result file of the current simulation step calculated by the RELAP5, backtracking the RELAP5 software to complete simulation of next simulation steps of the DET successful branch and the DET failed branch; and S7, repeating the process from the step S2 to the step S6 until the simulation time reaches a simulation task time specified by a user, and then finishing the dynamic coupling between DET and RELAP5 software.

Based on the above technical scheme, the specific implementation principle of S1 is as follows.

Figure 2:
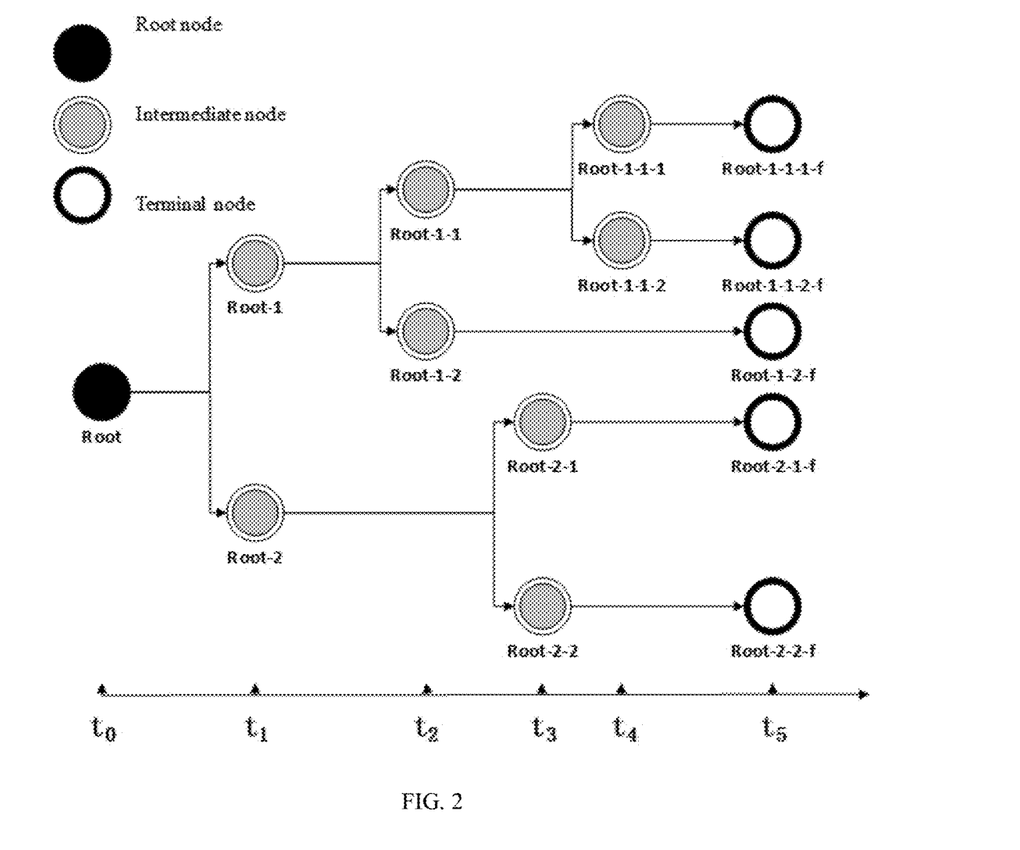
FIG. 2 is a schematic diagram of DET model structure of nuclear power plant state evolution.

Firstly, take the nuclear power plant system, equipment or operator's operation that needs simulation as the DET simulation object, and then make the following analysis according to the DET analysis method:

As shown in FIG. 2, each node in the figure represents a specific state $S_i$ of a nuclear power plant composed of the state combination of DET simulation objects, in which the root node represents the initial state $S_0$ of the nuclear power plant during the dynamic coupling simulation of DET and RELAP5, the intermediate node represents the combination of different states of the nuclear power plant system and equipment, and the final node represents a predefined absorption termination state of the nuclear power plant, such as the nuclear power plant core being damaged or stable;

the dynamic coupling between DET and RELAP5 will start from the root node, and the state of DET simulation object will change randomly with time. When the preset branching rule is reached, the "branching" generated from this moment represents a state transition of the simulation object; and the parent node to the child node represents a state transition of the simulation object;

when the trigger conditions of state transition of DET simulation object are met, there are only two states of successful state transition and failed state transition of DET simulation object; the new branch generated by the parent node corresponding to the DET model will evolve into a successful node and a failed node, in which the upper node represents the successful node, and the node coding mode is "parent node name–1; the lower node represents the node that failed to transfer, and the node coding method is "Parent Node Name-2"; the end node represents the termination of coupling between DET and RELAP5, and the encoding mode of the node name is "parent node name –f", and the system evolution process from parent node to child node is calculated by one or more simulation steps of RELAP5 software.

On the basis of the above scheme, as shown in FIG. 2, when DET is coupled with the RELAP5 software, the calculation is performed between each node; different from the traditional event tree method, the time of node branching in DET is determined by the physical process of RELAP5 simulation, which reduces the traditional method's dependence on analysts' experience or conservative engineering judgment.

Embodiment

Figure 3:
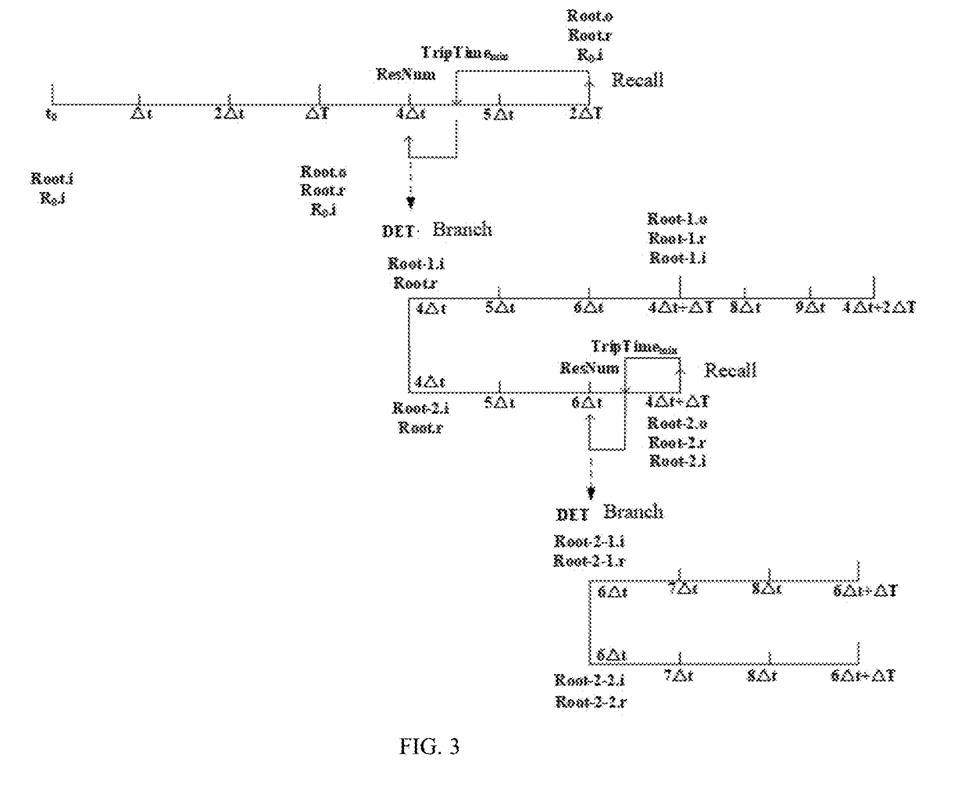
FIG. 3 is a schematic diagram of dynamic coupling between DET and RELAP5 software.

Based on the above technical scheme, the specific implementation process of steps S2-S7 is as follows:

As shown in FIG. 3, the symbols shown in the figure are defined as follows:

BloNum: the RELAP5 backtracking restart information block number calculated according to the minimum TRIP trigger time TRIPTimemin of DET simulation object state transition;

Timemax: the maximum simulation step time of CPU in the time control card in the RELAP5 software input card;

ErrNum: RELAP5 abnormal termination count;

MT: state transition task time of running state transition DET simulation object;

NorNum: RELAP5 normal time termination count;

Resfre: restart frequency of time control card in RELAP5 software input card;

ResNum: RELAP5 restart number corresponding to RELAP5 backtracking restart information block number BloNum;

Simtime: the simulation time of the time control card in the RELAP5 software input card, that is, the simulation time at the end of the current node;

Time: the task time of the coupling simulation between DET and RELAP5 is also the simulation termination time of the final termination of RELAP5 simulation;

TRIPTimemin: the minimum TRIP trigger time of state transition of DET simulation object in the current RELAP5 simulation step calculation result;

ResNumLast: the last restart number in the current RELAP5 simulation step calculation result file;

Δt: restart frequency in time control card of RELAP5 software input card;

ΔT: the simulation step size of each RELAP5 software.

With reference to FIG. 3, the overall process of dynamic coupling between DET and RELAP5 software is explained as follows:

first step: writing the input file Root.i and the initial restart file $R_0$.i of DET and RELAP5 coupling simulation accident analysis;

second step: modifying the TRIP information in Root.i by adding instrumental variables to form a new Root.i input file according to the state transition type of DET simulation object;

third step: running the RELAP5 software with the RELAP5 accident analysis input file Root.i as the initial input file and SimTime=ΔT as the simulation time at the DET root node;

fourth step: after the simulation step of RELAP5 is finished, the generated result files are Root.o and Root.r respectively; analyzing the time information of the change of TRIP variable controlled by the state of DET simulation object in the Root.o file;

fifth step: judging whether there is a branch in this simulation step; if there is no branch, updating the simulation time in the initial restart file $R_0.i$ of RELAP5, SimTime=SimTime+$\Delta T$, and then running RELAP5 analysis again with $R_0.i$ and Root.r as inputs;

sixth step: if there is a branch, obtaining the minimum trigger time TRIPTimemin of DET simulation object state transition Trip by parsing the Root.o file, and then obtaining the RELAP5 software backtracking restart number ResNum according to the rules;

seventh step: updating $R_0.i$ according to the state transition category of the DET simulation object, and respectively generating the DET successful branch RELAP5 restart file Root-1.i and the DET failed branch RELAP5 restart file Root-2.i;

eighth step: taking successful branch restart files and failed branch restart files, such as Root-1.i and Root-2.i, and the Root.r file calculated and output by the current node RELAP5 as inputs, and running RELAP5 respectively; the names of the output files of RELAP5 nodes are updated according to the rules, such as Root-1-1.i and Root-1-1.o, etc; and ninth step: cycling the process from the second step to the eighth step until the simulation time SimTime of the node RELAP5 reaches the simulation TaskTime or other termination conditions of RELAP5.

On the basis of the above scheme, determining an analysis object of the nuclear power plant initial accident in the first step, and programming the initial RELAP5 software input card file for simulating the nuclear power plant accident i according to the deterministic analysis method, wherein the input card file includes the initial RELAP5 input file Root.i and the initial restart calculation file $R_0.i$; where "Root" represents any file name that meets the requirements of RELAP5 software, "R0" represents the file name, and ".i" represents the file type. Moreover, the simulation model of the originating accident RELAP5 needs to be debugged and stabilized, and the typical accident sequence analysis results meet the expectations; after the debugging of Root.i is stable, initialize the first data bit of the 201 time control card in the Root.i input card to $\Delta T$.

Figure 6:
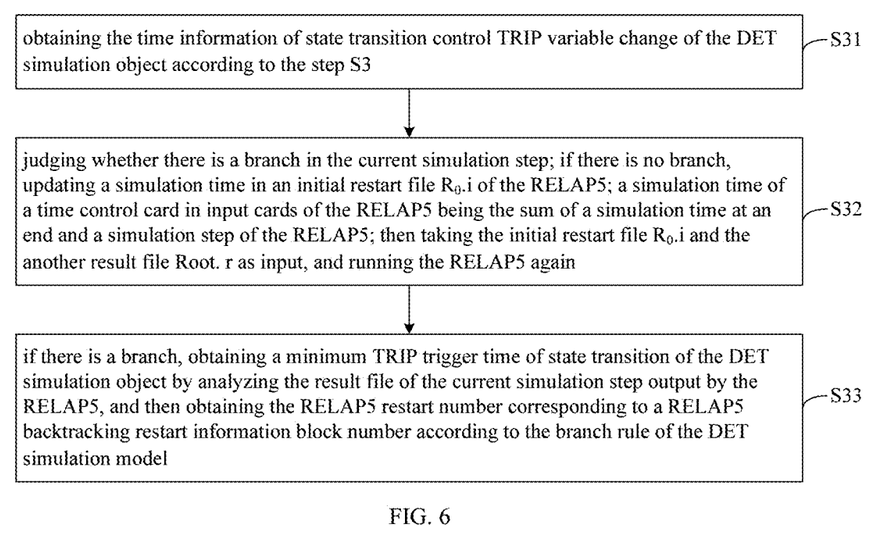
FIG. 6 is a flow chart of a specific method for identifying the DET branch moment when the state transition of the DET simulation object occurs.

In the first step, the RELAP5 initial restart calculation file $R_0.i$ file includes: RELAP5 software restart 103 card, RELAP5 software time step control 201 card, and RELAP5 software 100 card. Specifically, taking the first DET branch of the root node in FIG. 2 and FIG. 3 as an example:

S31, obtaining a time information of state transition control TRIP variable change of DET simulation object according to the third step;

S32, judging whether there is a branch in the simulation time step; if there is no branch, the simulation time in the initial restart file $R_0.i$ of RELAP5 is updated, the simulation time of the time control card in the input card of RELAP5 software is the sum of the simulation time at the end and the simulation step size of RELAP5 software, and then the initial restart calculation file $R_0.i$ and the result file Root.r are used as inputs to run the RELAP5 software again; and S33, if there is a branch, obtaining the minimum trigger time of state transition TRIP of DET simulation object by analyzing the result file, and then obtaining the RELAP5 restart number corresponding to its RELAP5 backtracking restart information block number according to the branch rule of DET simulation model.

The method for judging and identifying whether there is DET branch in the simulation time step is as follows:

(1): initializing the state transition TRIP trigger time set variables {TRIPT1, TRIPT 2, . . . , TRIPT N} of DET simulation object and the current node TRIP trigger event set variables {NowTRIPT1, NowTRIPT 2, . . . , NowTRIPT N}, and each trigger time is "−1". Where n represents the number of TRIP logic related to the state transition of DET simulation object;

(2): opening the *.o file output of RELAP5, extracting the trigger times of all TRIP numbers related to the state transition of DET simulation objects in the last Restart information module in the output file Root.o, and obtaining the current simulation step DET simulation object state transition TRIP trigger time set {NowTRIPT 1, NowTRIPT 2, . . . , NowTRIPT n};

(3): comparing the elements of {TRIPT1, TRIPT 2, . . . , TRIPT N} and {NowTRIPT1, NowTRIPT 2, . . . , NowTRIPTN} one by one, and obtaining the information set {NowTRIPTi} of trip trigger time change, where i∈(1, n); if {NowTRIPTi} is empty, there is no state transition of DET simulation object and no DET branch in this step, and the identification of DET branch in this step is finished; if {NowTRIPTi} is not empty, there is a state transition process of the DET simulation object in this step simulation, and there is a DET branch, so the identification of the DET branch in this step is finished.

Figure 4:
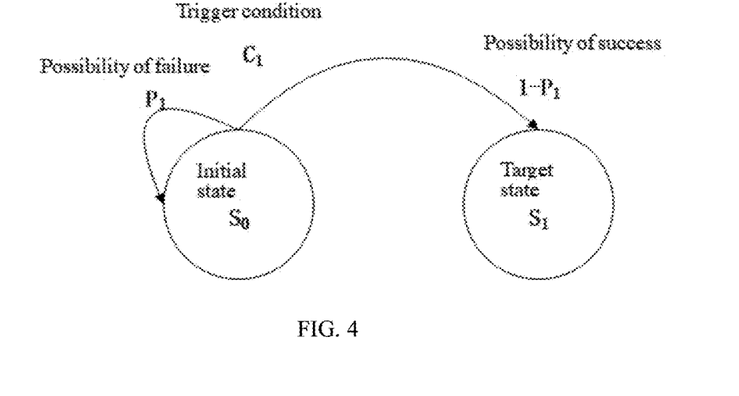
FIG. 4 is a schematic diagram of a single state transition of a DET simulation object.
Figure 5:
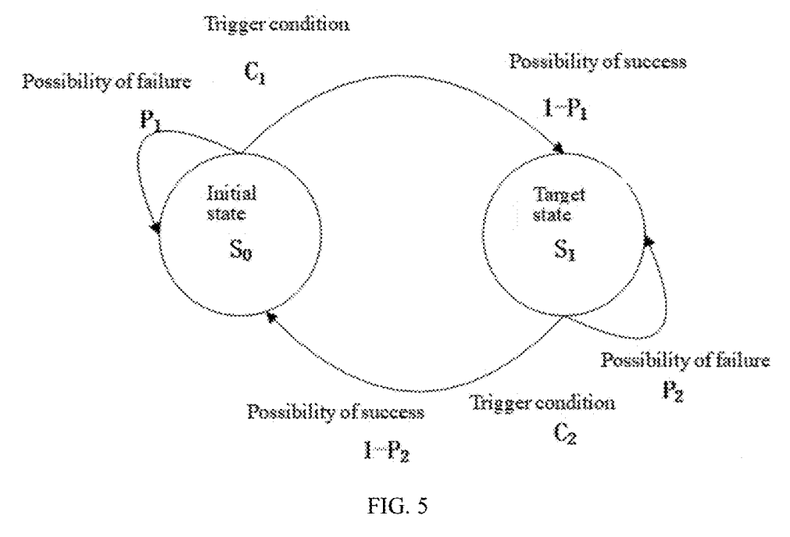
FIG. 5 is a schematic diagram of multiple state transitions of DET simulation objects.

On the basis of the above scheme, in the second step, set the universal instrumental TRIP variable as follows: Specifically, the general-purpose instrumental TRIP variables are divided into parametric and logical state transition objects in the DET and RELAP5 coupling methods, and the specific setting methods of them according to single state transition and multiple state transitions are as follows.

(1) Setting method of parameter state transition TRIP instrumental variables

In RELAP5 software, the modification mode of the demand-type single state transfer instrumental TRIP card is as follows:

CC1 control the judgment logic 1 of DET simulation object state transition

1. If it is detected that CC1 is True and the state will change, its branch logic is as follows:
    state unchanged: CC1 time 0 ge null 0 0.0 n
    state transition: CC1 inherits the initial TRIP logic 2. If CC1 is detected to be False and the state will change, its branch logic is as follows:
    state unchanged: CC1 time 0 lt null 0 −10.0 n
    state transition: CC1 inherits the initial TRIP logic
    in which:

CC1: TRIP logic for controlling the transition of normal demand state of DET simulation object set according to the accident characteristics of nuclear power plant, if the input file of initial RELAP5 satisfies independence. In this application, it is discussed that when the initial logic value of CC1 is "false" and "true", different state transition rules shown above are met under different initial state conditions.

598: Instrumental TRIP variable, whose logical value is a "true" constant;

599: Instrumental TRIP variable, whose logical value is a "false" constant.

When the state transition recovery signal is detected in the DET branch process, reset the CC1 logic after state transition to the control logic before transition, wait for the subsequent parametric branch signal to trigger and branch according to the above rules, so that multiple state transitions of CC1 can be realized.

(2) setting method of TRIP variable assisted by logic state transition

In the RELAP5 software, the logic state transition assists the TRIP card modification as shown in the following figure.

Instrumental variable forever true trip: 598 time 0 ge null 0 0.0 n

Instrumental variable permanent vacation trip: 599 time 0 lt null 0 −10.0 n

CC1 TRIP logic of DET simulation object of single demand state transition 1

Instrumental variable 799Trip: 799 original CC1TRIP logic (when 799 is used, 798 card is selected, and so on)

1. If it is detected that CC1 is True and the state will change, its branch logic is as follows:
   State unchanged: CC1 799 and 599 n
   State transition: CC1 inherits the initial TRIP logic 2. If CC1 is detected to be False and the state will change, its branch logic is as follows:
   state unchanged: CC1 799 and 598 n
   state transition: CC1 inherits the initial TRIP logic n in which:

CC1: the TRIP logic controls DET simulation objects and makes one state transition. When the TRIP state transition signal is detected, the first state transition rule is executed when the initial state is True, and the second state transition rule is executed when the initial state is False, and its value will not change after the state transition.

598: Instrumental TRIP variable, whose logical value is a "true" constant;

599: Instrumental TRIP variable, whose logical value is a "false" constant;

799: Instrumental TRIP variable, whose logical value is a constant exactly the same as CC1's logical value;

when the state transition recovery signal is detected in the DET branch process, the CC1 logic after the state transition is reset to the control logic before the transition, and the multiple state transitions of CC1 can be realized by waiting for the subsequent branch signal to continue to execute the above branch rules.

Figure 7:
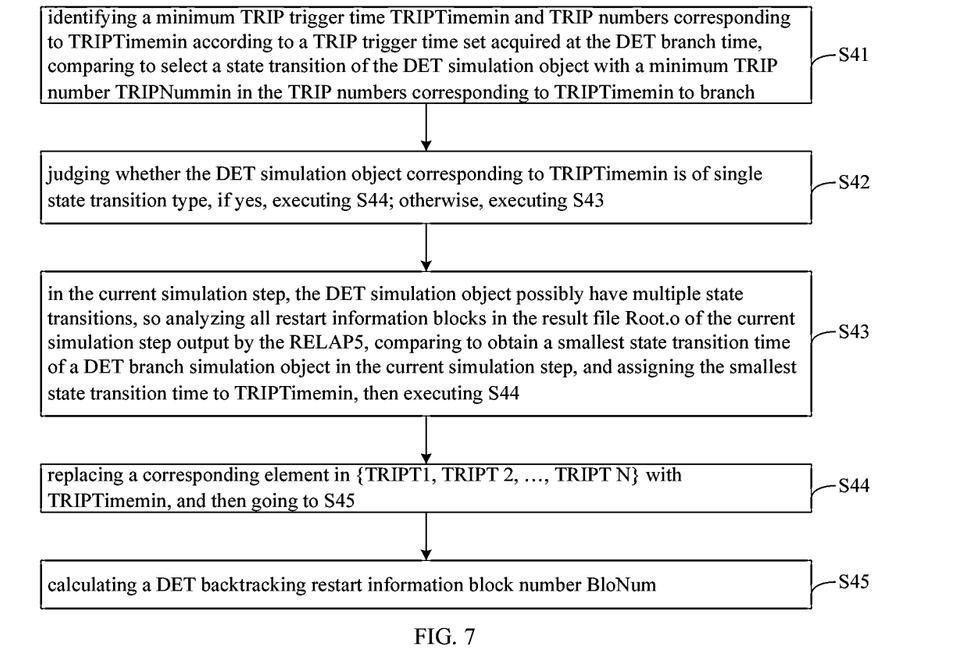
FIG. 7 is a flow chart of the DET backtracking restart number identification method.

On the basis of the above scheme, referring to FIG. 2 and the second simulation step of RELAP5 output file in FIG. 3, that is, the branch at the end of 2ΔT, the identification method of DET backtracking restart number is illustrated as follows:

S41: identifying the minimum trigger time TRIPtimemin and the TRIP number corresponding to TRIPTimemin according to the set of TRIP trigger times acquired at the time of DET branching, comparing and selecting the state transition of DET simulation object with the minimum TRIPNummin in the trip number corresponding to TRIP-Timemin for branching;

S42: judging whether the DET simulation object corresponding to TRIPTimemin is of single state transition type, and if so, executing S44; otherwise, executing S43;

S43: this simulation step DET simulation object possibly have multiple state transitions, analyzing all the Restart information blocks in the Root.o file, comparing and obtaining the smallest state transition moment of this step DET branch simulation object, and assigning it to TRIPTimemin, then execute S44;

S44: replacing the corresponding elements in {TRIPT1, TRIPT 2, . . . , TRIPT N} with TRIPTimemin, and then executing S45; and S45: calculating the number BloNum of DET backtracking restart information block.

On the basis of the above scheme, the above BloNum is calculated by the following formula:

$$\Delta t = CpuTimemax \times ResFre$$

$$BloNum = INT\left[\frac{TRIPTimemin}{\Delta t} - \frac{1}{2}\right]$$

in which:

BloNum: the RELAP5 backtracking restart information block number calculated according to the minimum TRIP trigger time TRIPTimemin of DET simulation object state transition;

CpuTimemax: the maximum simulation step time of CPU in the time control card in the RELAP5 software input card;

INT[ ]: rounding function;

Resfre: restart frequency of time control card in RELAP5 software input card;

TRIPTimemin: the minimum TRIP trigger time of state transition of DET simulation object in the current RELAP5 simulation step calculation result;

Δt: the time interval between two restart information blocks in the time control card of RELAP5 software input card.

According to the above formula, it can be determined that the state transition time of a simulation step is smaller than that of the DET simulation object, and the nearest RELAP5 information block number BloNum; the restart number ResNum required by RELAP5 backtracking calculation corresponding to BloNum can be found through the analysis of Root.o of the simulation step RELAP5 output file. Use ResNum to update the restart number in RELAP5 restart card, and combine the r file of the current node RELAP5, such as Root.r in FIG. 3, to continue running RELAP5 simulation at the corresponding time point of ResNum.

Figure 8:
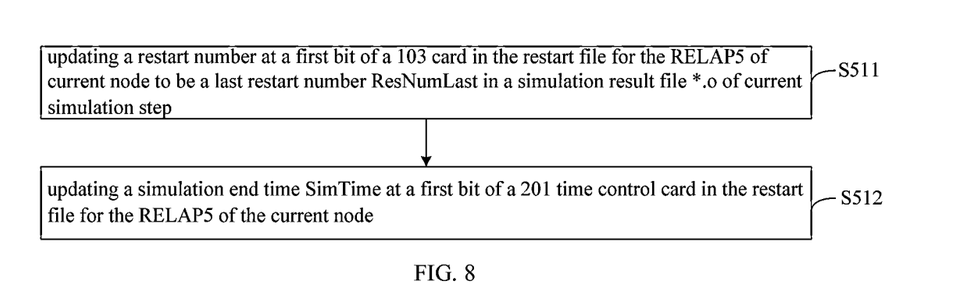
FIG. 8 is a flow chart of RELAP5 restart file updating method for DET branch without state transition of DET simulation object.
Figure 9:
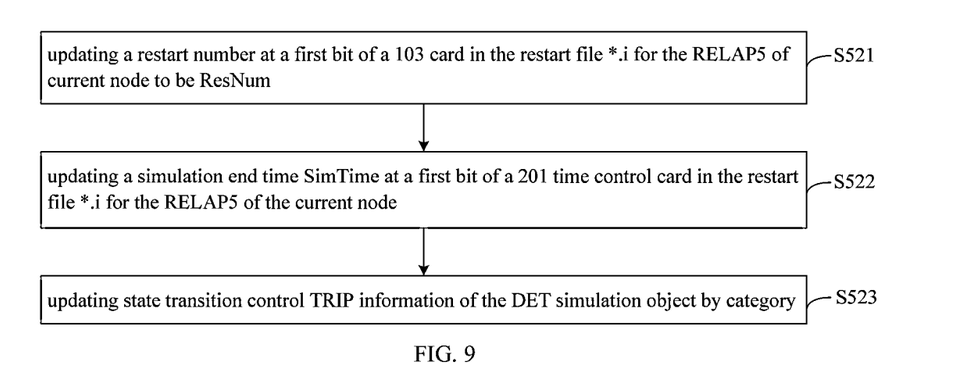
FIG. 9 is a flow chart of RELAP5 restart file updating method for DET simulation object state transition in DET branch.

On the basis of the above scheme, in the fifth step, the RELAP5 restart file is updated at the end of each RELAP5 simulation step, and the restart file needs to be updated according to the following two situations: ① there is no state transition of DET simulation object in DET branch; and ② there is state transition of DET simulation object in DET branch.

Specifically, in view of the fact that there is no state transition of the DET simulation object in the DET branch, the RELAP5 restart file update method is as follows:

S511: updating the restart number of a first bit of a 103 card in the RELAP5 restart file of the current node to the last restart number ResNumLast in the simulation result *.o file of this simulation step; and S512: updating the simulation end time SimTime of the first bit of a 201 time control card in the RELAP5 restart file of the current node according to the following formula;

$$SimTime = SimTime + \Delta T$$

in which SimTime: the simulation time of the time control card in the RELAP5 software input card, that is, the simulation time at the end of the current node; ΔT: the simulation step size of each RELAP5 software.

Specifically, as there is a state transition of DET simulation object in the DET branch, the RELAP5 restart file update method is as follows:

S521: updating the restart number of the first bit of a 103 card in the RELAP5 restart file *.i of the current node to ResNum;

Step 522: updating the simulation end time SimTime of the first bit of the 201 time control card in the RELAP5 restart file *.i of the current node according to the following formula:

$$SimTime = \text{INT}\left[\frac{TRIPTimemin}{\Delta t} - \frac{1}{2}\right] \times \Delta t + \Delta T$$

in which INT[ ]: rounding function; TRIPTimemin: the minimum TRIP trigger time of state transition of DET simulation object in the current RELAP5 simulation step calculation result; $\Delta t$: the time interval between two restart information blocks in the time control card in the RELAP5 software input card; $\Delta T$: the simulation step size of each RELAP5 software; and Step 523: updating the state transition control TRIP information of DET simulation object by category.

On the basis of the above scheme, the general TRIP variable is variable or logical variable, and the specific settings are as follows:

if the state transition control TRIP of DET simulation object is variable, the TRIP information will be updated as follows:

CC1 control the judgment logic 1 of DET simulation object state transition

1. If it is detected that CC1 is True and the state will change, its branch logic is as follows:
   state unchanged: CC1 time 0 ge null 0 0.0 n
   state transition: CC1 inherits the initial TRIP logic
2. If CC1 is detected to be False and the state will change, its branch logic is as follows:
   state unchanged: CC1 time 0 lt null 0 −10.0 n
   state transition: CC1 inherits the initial TRIP logic If it is recognized that the initial state of DET simulation object is true, the upper and lower branch restart files are updated as follows:

Upper branch (successful branch, state transition branch): the restart file $R_0.i$ is not updated. That is, in the actual process, the program will undergo state transition according to the established transition rules;

Lower branch (failed branch, branch with no status transition): add a line of TRIP information in the restart file $R_0.i$ according to the RELAP5 rule.

CC1 time 0 ge null 0 0.0 n where CC1 is the TRIP number of the initial DET simulation object state transition control.

If it is recognized that the initial state of the DET simulation object is false, the restart files of the upper and lower branches are updated as follows:

Upper branch (successful branch, state transition branch): the restart file $R_0.i$ is not updated. That is, in the actual process, the program will undergo state transition according to the established transition rules;

Lower branch (failed branch, branch with no status transition): add a line of TRIP information in the restart file $R_0.i$ according to the RELAP5 rule.

CC1 time 0 lt null 0 −10.0 n where CC1 is the TRIP number of the initial DET simulation object state transition control.

If the state transition control TRIP of DET simulation object is logical, the TRIP information will be updated as follows:

Instrumental variable forever true trip: 598 time 0 ge null 0 0.0 n

Instrumental variable permanent vacation trip: 599 time 0 lt null 0 −10.0 n

CC1 TRIP logic of DET simulation object of single demand state transition 1

Instrumental variable 799TRIP: 799 initial CC1TRIP logic (when 799 is used, 798 card is selected, and so on)

1. If it is detected that CC1 is True and the state will change, its branch logic is as follows:
   state unchanged: CC1 799 and 599 n
   state transition: CC1 inherits the initial TRIP logic
2. If CC1 is detected to be False and the state will change, its branch logic is as follows:
   state unchanged: CC1 799 and 598 n
   state transition: CC1 inherits the initial TRIP logic n If it is recognized that the initial state of DET simulation object is true, the upper and lower branch restart files are updated as follows:

upper branch (successful branch, state transition branch): the restart file $R_0.i$ is not updated. That is, in the actual process, the program will undergo state transition according to the established transition rules;

lower branch (failed branch, branch with no status transition): add a line of TRIP information in the restart file $R_0.i$ according to the RELAP5 rule.

CC1 799 and 598 n in which

CC1: is the TRIP number of the initial DET simulation object state transition control;

799: TRIP number of any instrumental variable, which meets the requirements of RELAP5 and satisfies independence and uniqueness.

598: The instrumental variable TRIP number, whose logical value is always "true"

If it is recognized that the initial state of the DET simulation object is false, the restart files of the upper and lower branches are updated as follows:

upper branch (successful branch, state transition branch): the restart file $R_0.i$ is not updated. That is, in the actual process, the program will undergo state transition according to the established transition rules;

lower branch (failed branch, branch with no status transition): add a line of TRIP information in the restart file $R_0.i$ according to the RELAP5 rule.

CC1 799 and 598 n

CC1: is the TRIP number of the initial DET simulation object state transition control;

799: TRIP number of any instrumental variable, which meets the requirements of RELAP5 and satisfies independence and uniqueness.

599: The instrumental variable TRIP number, the logical value of which is always "false"

Among them, 598(CCT) is the number of a logical TRIP in a RELAP5 software, which is an additional instrumental variable to facilitate the dynamic coupling between DET and RELAP5 software, and its logical meaning is always "true". In the actual application process, the logical variable numbers that meet the requirements of uniqueness and independence can be used according to the requirements of RELAP5 software.

590(CCF) is the number of a logical TRIP in a RELAP5 software, and it is an additional instrumental variable to facilitate the dynamic coupling between DET and RELAP5 software. Its logic refers to "forever false". In the actual application process, the logical variable numbers that meet the requirements of uniqueness and independence can be used according to the requirements of RELAP5 software. It can also be replaced by a CCT or CCF.

Embodiment

According to the accident characteristics and simulation resource conditions, initialize the related parameters of dynamic coupling between DET and RELAP5, including:

BloNum: the RELAP5 backtracking restart information block number calculated according to the minimum TRIP trigger time TRIPTimemin of DET simulation object state transition, with an initial value of 0;

Timemax: the maximum simulation step time of CPU in the time control card in the relap5 software input card, the initial value is user-defined;

ErrNum: RELAP5 abnormal termination count, with an initial value of 0;

MT: state transition task time of operational state transition DET simulation object, determining the number of required task time random variables according to the number of involved operational state transition objects, and dispersing each task time random variable according to a user-defined dispersing mode to obtain a discrete task time sequence;

NorNum: the normal time termination count of RELAP5, with an initial value of 0;

ResFre: restart frequency of time control card in RELAP5 software input card, user-defined;

ResNum: RELAP5 restart number corresponding to RELAP5 backtracking restart information block number BloNum, with an initial value of 0;

SimTime: the simulation time of the time control card in the RELAP5 software input card, that is, the simulation time at the end of the current node, with an initial value of $\Delta T$;

TaskTime: the task time of the coupling simulation between DET and RELAP5 is also the simulation termination time of the final termination of RELAP5 simulation, with the initial value defined by users;

TRIPTimemin: the minimum TRIP trigger time of state transition of DET simulation object in the current calculation result of RELAP5 simulation step, with an initial value of 0;

ResNumLast: the last restart number in the current RELAP5 simulation step calculation result file, with an initial value of 0;

$\Delta t$: restart frequency in time control card of RELAP5 software input card, initial value is user-defined;

$\Delta T$: the simulation step length of each RELAP5 software, the initial value is user-defined.

As shown in FIG. 3, the dynamic and concrete coupling process of DET and RELAP5 software:

S(1): putting the initial RELAP5 input file Root.i and the initial restart file $R_0$.i of the DET root node into the calculation queue as a pair of files;

S(2): determining whether the RELAP input file exists in the calculation queue. if there is a RELAP5 input file, according to the principle of "last-in, first-out", selecting a RELAP5 input file as the input of the RELAP5 software, assuming the file name is *.i, and running the REALP5 simulation to obtain the RELAP5 output results *.o and *. r; if there is no RELAP5 input file in the calculation queue, executing S (5);

S (3): Take *.o as the input and use the DET branch discrimination method to judge whether there is a DET branch. If there is no DET branch, update the restart file *.i of the last RELAP5 simulation step corresponding to *.o according to the category without DET branch. The restart file corresponding to the root node Root.i is the initial $R_0$.i; other restart file names are consistent with the input file names of the current simulation step RELAP5; the updated restart file *.i and the corresponding R file *.r of RELAP5 are put into the calculation queue as a calculation case; then perform S(2);

If there is a branch, S (4) is executed;

S(4): according to the category of DET simulation object, according to the restart file updating method, generating the restart files of successful branch and failed branch of DET, which are named *-1.i and *-2.i, respectively, and forming two calculation cases with the R file *.r of REALP5, and putting the two cases in the calculation queue, then executing S(2); and S (5): each DET branch reaches the simulation task time specified by the user or the RELAP5 simulation termination condition, and the dynamic coupling between DET and RELAP5 software is finished;

To sum up, after the dynamic coupling between DET and RELAP5 software, the physical characteristics of nuclear power plants with different branch sequences can be extracted by analyzing the input files of each branch node and the end node; the safety characteristics of nuclear power plants can be obtained through statistical analysis, cluster analysis, etc.

The above-mentioned embodiments only express one or more embodiments of this application, and their descriptions are more specific and detailed, but they should not be construed as limiting the patent scope of this application. It should be pointed out that, for those of ordinary skill in the art, without departing from the concept of this application, several modifications and improvements can be made, all of which are within the scope of protection of this application.

What is claimed is:

1. A dynamic characteristic analysis method of dynamic event tree (DET) and reactor excursion and leak analysis program (RELAP5) coupling based on a universal instrumental variable method, comprising following steps:
    S1, constructing a DET simulation model of a discrete DET, and modifying a TRIP card of an input file of a RELAP5 by adding a universal instrumental TRIP variable according to a state transition type of a DET simulation object; wherein the universal instrumental TRIP variable is variable type or logical type;
    S2, determining a simulation time and a current simulation step of the DET simulation object applied to the RELAP5, and running the RELAP5;
    S3, analyzing, based on a result file of the current simulation step output by the RELAP5, the result file to obtain time information of state transition control TRIP variable change of the DET simulation object;
    S4, identifying a DET branch time of state transition occurrence of the DET simulation object, and obtaining a RELAP5 restart number for the RELAP5 backtracking restart according to a branch rule of the DET simulation model;
    S5, determining the state transition type of the DET simulation object, updating a restart file for the RELAP5, and generating restart input files of a DET successful branch and a DET failed branch for the RELAP5;
    S6, determining a backtracking restart time of the RELAP5 according to the DET branch time, taking the restart input files of the DET successful branch and the DET failed branch as inputs and combining with another result file of the current simulation step calculated by the RELAP5, backtracking the RELAP5 to complete simulation of next simulation steps of the DET successful branch and the DET failed branch; and
    S7, repeating the process from the step S2 to the step S6 until the simulation time reaches a simulation task time specified by a user, and then finishing a dynamic coupling between DET and RELAP5.

2. The dynamic characteristic analysis method according to claim 1, wherein in the step S1, a system, equipment or operator operation of a nuclear power plant is taken as the DET simulation object, and a state transition of the DET simulation object is controlled by the TRIP variable in the RELAP5; and logic values of the TRIP variable are divided into True and False; a TRIP variable space vector of the DET simulation object is $\vec{s} = \{s1, s2, \ldots, sn\}$, where n is a number of the DET simulation object, $S_i$ represents the logical value of the TRIP variable corresponding to the $i^{th}$ DET simulation object, and $$S_i = \begin{cases} 0 \\ 1 \end{cases} 1 \le i \le n.$$

3. The dynamic characteristic analysis method according to claim 1, wherein the step S2 comprises determining an analysis object of initial accident of a nuclear power plant, and programming initial input card files for the RELAP5 of simulating the accident of the nuclear power plant according to a deterministic analysis method; the input card files comprise an initial RELAP5 input file Root.i and an initial restart file $R_0$.i, where "Root" represents any file name in line with requirements of the RELAP5, "$R_0$" represents a file name, and ".i" represents a file type.

4. The dynamic characteristic analysis method according to claim 3, wherein in the step S2, the initial restart file $R_0$.i comprises: a restart 103 card of the RELAP5, a time step control 201 card of the RELAP5, and a 100 card of the RELAP5.

5. The dynamic characteristic analysis method according to claim 1, wherein in the step S3 and the step S4, a specific method of identifying the DET branch time of state transition occurrence of the DET simulation object comprises:

S31, obtaining the time information of state transition control TRIP variable change of the DET simulation object according to the step S3;

S32, judging whether there is a branch in the current simulation step; if there is no branch, updating a simulation time in an initial restart file $R_0$.i of the RELAP5; a simulation time of a time control card in input cards of the RELAP5 being the sum of a simulation time at an end and a simulation step of the RELAP5; then taking the initial restart file $R_0$.i and the another result file Root. r as input, and running the RELAP5 again;

S33, if there is a branch, obtaining a minimum TRIP trigger time of state transition of the DET simulation object by analyzing the result file of the current simulation step output by the RELAP5, and then obtaining the RELAP5 restart number corresponding to a RELAP5 backtracking restart information block number according to the branch rule of the DET simulation model.

6. The dynamic characteristic analysis method according to claim 1, wherein in the step S4, a DET backtracking restart number identification method comprises:

S41, identifying a minimum TRIP trigger time TRIPTimemin and TRIP numbers corresponding to TRIPTimemin according to a TRIP trigger time set acquired at the DET branch time, comparing to select a state transition of the DET simulation object with a minimum TRIP number TRIPNummin in the TRIP numbers corresponding to TRIPTimemin to branch;

S42, judging whether the DET simulation object corresponding to TRIPTimemin is of single state transition type, if yes, executing S44; otherwise, executing S43;

S43, in the current simulation step, the DET simulation object possibly have multiple state transitions, so analyzing all restart information blocks in the result file Root.o of the current simulation step output by the RELAP5, comparing to obtain a smallest state transition time of a DET branch simulation object in the current simulation step, and assigning the smallest state transition time to TRIPTimemin, then executing S44;

S44, replacing a corresponding element in {TRIPT1, TRIPT 2, ..., TRIPT N} with TRIPTimemin, and then going to S45; and S45: calculating a DET backtracking restart information block number BloNum.

7. The dynamic characteristic analysis method according to claim 6, wherein the DET backtracking restart information block number BloNum is calculated by a following formula:

$$\Delta t = CpuTimemax \times ResFre$$

$$BloNum = INT\left[\frac{TRIPTimemin}{\Delta t} - \frac{1}{2}\right]$$

where BloNum represents the backtracking restart information block number calculated according to the minimum TRIP trigger time TRIPTimemin of state transition of the DET simulation object;

CpuTimemax represents a maximum simulation step time of a CPU in a time control card of input cards of the RELAP5;

INT[ ] represents a rounding function;

ResFre represents a restart frequency of the time control card of the input cards of the RELAP5;

TRIPTimemin represents the minimum TRIP trigger time of state transition of the DET simulation object of calculation result in the current simulation step of the RELAP5;

Δt represents a time interval between two restart information blocks in the time control card of the input cards of the RELAP5.

8. The dynamic characteristic analysis method according to claim 1, wherein in the step S5, a method for updating the restart file for the RELAP5 comprises: at an end of each simulation step of the RELAP5, the restart file is updated according to following two situations: ①, there is no state transition of DET simulation object in a DET branch, and ② there is a state transition of DET simulation object in the DET branch.

9. The dynamic characteristic analysis method according to claim 8, wherein as there is no state transition of DET simulation object in the DET branch, the method for updating the restart file for the RELAP5 comprises:

S511: updating a restart number at a first bit of a 103 card in the restart file for the RELAP5 of current node to be a last restart number ResNumLast in a simulation result file *.o of current simulation step; and S512: updating a simulation end time SimTime at a first bit of a 201 time control card in the restart file for the RELAP5 of the current node according to a following formula:

$$SimTime = SimTime + \Delta T$$

where SimTime represents a simulation time of the time control card in input cards of the RELAP5, namely, a simulation time at the end of the current node; and ΔT represents each the simulation step of the RELAP5.

10. The dynamic characteristic analysis method according to claim 8, wherein as there is a state transition of DET simulation object in the DET branch, the method for updating the restart file for the RELAP5 comprises:

S521: updating a restart number at a first bit of a 103 card in the restart file *.i for the RELAP5 of current node to be ResNum;

S522: updating a simulation end time SimTime at a first bit of a 201 time control card in the restart file *.i for the RELAP5 of the current node according to a following formula:

$$SimTime = \text{INT}\left[\frac{TRIPTimemin}{\Delta t} - \frac{1}{2}\right] \times \Delta t + \Delta T$$

where INT[ ] represents a rounding function, TRIPTimemin represents a minimum TRIP trigger time of state transition of the DET simulation object of calculation result in the current simulation step of the RELAP5, $\Delta t$ represents a time interval between two restart information blocks in the time control card of input cards of the RELAP5, $\Delta T$ represents each the simulation step of the RELAP5; and S523: updating state transition control TRIP information of the DET simulation object by category.

\* \* \* \* \*